United States Patent [19]

Monette

[11] Patent Number: 5,203,441
[45] Date of Patent: Apr. 20, 1993

[54] ADAPTOR FOR USE IN A FLYWHEEL AND TRANSMISSION ASSEMBLY

[75] Inventor: Daniel A. Monette, Battle Creek, Mich.

[73] Assignee: Eaton Corporation, Cleveland, Ohio

[21] Appl. No.: 891,024

[22] Filed: Jun. 1, 1992

[51] Int. Cl.$^5$ .............................................. F16D 13/58
[52] U.S. Cl. ................................ 192/112; 74/606 R; 403/3; 403/337
[58] Field of Search ............. 192/112, 115; 74/606 R; 29/401.1; 403/337, 336, 3, 4

[56] References Cited

U.S. PATENT DOCUMENTS

| | | | |
|---|---|---|---|
| 4,111,069 | 9/1978 | Blair et al. | 74/606 R |
| 4,160,472 | 7/1979 | Blackstone | 403/336 X |
| 4,362,065 | 12/1982 | Baratti | 29/401.1 X |
| 4,478,593 | 10/1984 | Brown | 192/112 X |
| 4,491,755 | 1/1985 | Bertrand | 403/337 X |
| 5,044,227 | 9/1991 | Rugraff | 74/606 R |

FOREIGN PATENT DOCUMENTS

1068405   5/1967   United Kingdom ............. 74/606 R

*Primary Examiner*—Rodney H. Bonck
*Attorney, Agent, or Firm*—L. J. Kasper

[57] ABSTRACT

An adaptor (25) is disclosed for use in mounting a transmission clutch housing (21) to a flywheel housing (11') wherein the flywheel housing defines a first bolt circle pattern (R1), and the clutch housing defines a second, substantially smaller bolt circle pattern (R2). The adaptor includes a first portion (27) and a second portion (29), the portions defining pluralities of bolt holes (37 and 43). The first portion defines a forward surface (33) and the second portion defines a rearward surface (41), both surfaces coinciding with an imaginary transverse mounting plane MP. The forward surface of the first portion engages a mounting surface (62) of the flywheel housing, while the rearward surface of the second portion engages a forward surface (54) of the clutch housing, such that the use of the adaptor (25) does not change the relative axial position of the flywheel housing and clutch housing, which would require a change in the configuration or length of the transmission input shaft (19).

10 Claims, 3 Drawing Sheets

ADAPTOR FOR USE IN A FLYWHEEL AND TRANSMISSION ASSEMBLY

BACKGROUND OF THE INVENTION

The present invention relates to flywheel and transmission assemblies for vehicles, and in particular, to such an assembly which includes an adaptor disposed between the flywheel housing and the transmission clutch housing.

Although the present invention may be used advantageously in practically any vehicle application, it is especially suited for use with a flywheel and transmission assembly for a truck, and especially for a heavy duty truck, and will be described in connection therewith.

As is well known to those skilled in the art, many of the drive train components, as well as other components, of heavy duty trucks, are specified by the ultimate vehicle owner, such as the owner or operator of a fleet of trucks. Partially as a result of such a component selection process, a particular truck may ultimately be equipped with any one of a number of different transmission-and-clutch combinations, and either of several different engine and flywheel combinations.

It is necessary to mate or match the flywheel housing and the transmission clutch housing, typically, bolting the latter to the former. Among the commonly used flywheel housings, some are provided with a series of bolt holes which comprise an SAE No. 1 pattern, while others are provided with a series of bolt holes which comprise an SAE No. 2 pattern.

As a result, it has generally been necessary, for any given transmission, to tool and manufacture at least two different transmission clutch housings, one having an SAE No. 1 bolt pattern and another having an SAE No. 2 bolt pattern, with the appropriate transmission clutch housing being assembled to the transmission for assembly in the vehicle. The need to tool and manufacture two different transmission clutch housings, to be able to mate with either of two different flywheel housings, adds substantially to the manufacturing and inventory costs of such transmissions.

In an attempt to overcome the problem described above, some of those skilled in the art have attempted to provide an adaptor between the transmission clutch housing and the flywheel housing which would facilitate the use of a transmission clutch housing having an SAE No. 2 bolt pattern with a flywheel housing having an SAE No. 1 bolt pattern. However, the typical adaptor which has been provided has changed the relative axial location between the flywheel and the transmission, thus necessitating a change in the input shaft configuration, i.e., typically the length of the input shaft.

SUMMARY OF THE INVENTION

Accordingly, it is an object of the present invention to provide a flywheel and transmission assembly wherein a particular transmission clutch housing may be used with either of several flywheel housing configurations, without necessitating a change in the length of the transmission input shaft.

The above and other objects of the invention may be accomplished by the provision of a flywheel and transmission assembly comprising a flywheel housing defining a rearwardly-disposed mounting surface and a plurality of bolt holes defining a first bolt circle pattern. The assembly also includes a transmission clutch housing defining a forwardly-disposed mounting surface and a plurality of bolt holes defining a second bolt circle pattern, the first bolt circle pattern having a substantially larger diameter than the second bolt circle pattern.

The assembly also includes an adaptor comprising a first portion defining a forward surface disposed in engagement with the rearwardly-disposed mounting surface, the forward surface defining an imaginary transverse mounting plane, and the first portion defining a plurality of bolt holes defining the first bolt circle pattern. The adaptor further comprises a second portion defining a rearward surface disposed in engagement with the forwardly-disposed mounting surface, and means interconnecting the first and second portions. The second portion of the adaptor is disposed within the flywheel housing and the rearward surface of the second portion coincides with the imaginary transverse mounting plane. The second portion defines a plurality of bolt holes defining the second bolt circle pattern.

The assembly also includes a first plurality of connectors attaching the first portion of the adaptor to the flywheel housing, and a second plurality of connectors attaching the second portion of the adaptor to the transmission clutch housing.

DESCRIPTION OF THE PREFERRED EMBODIMENT

Figure 1:
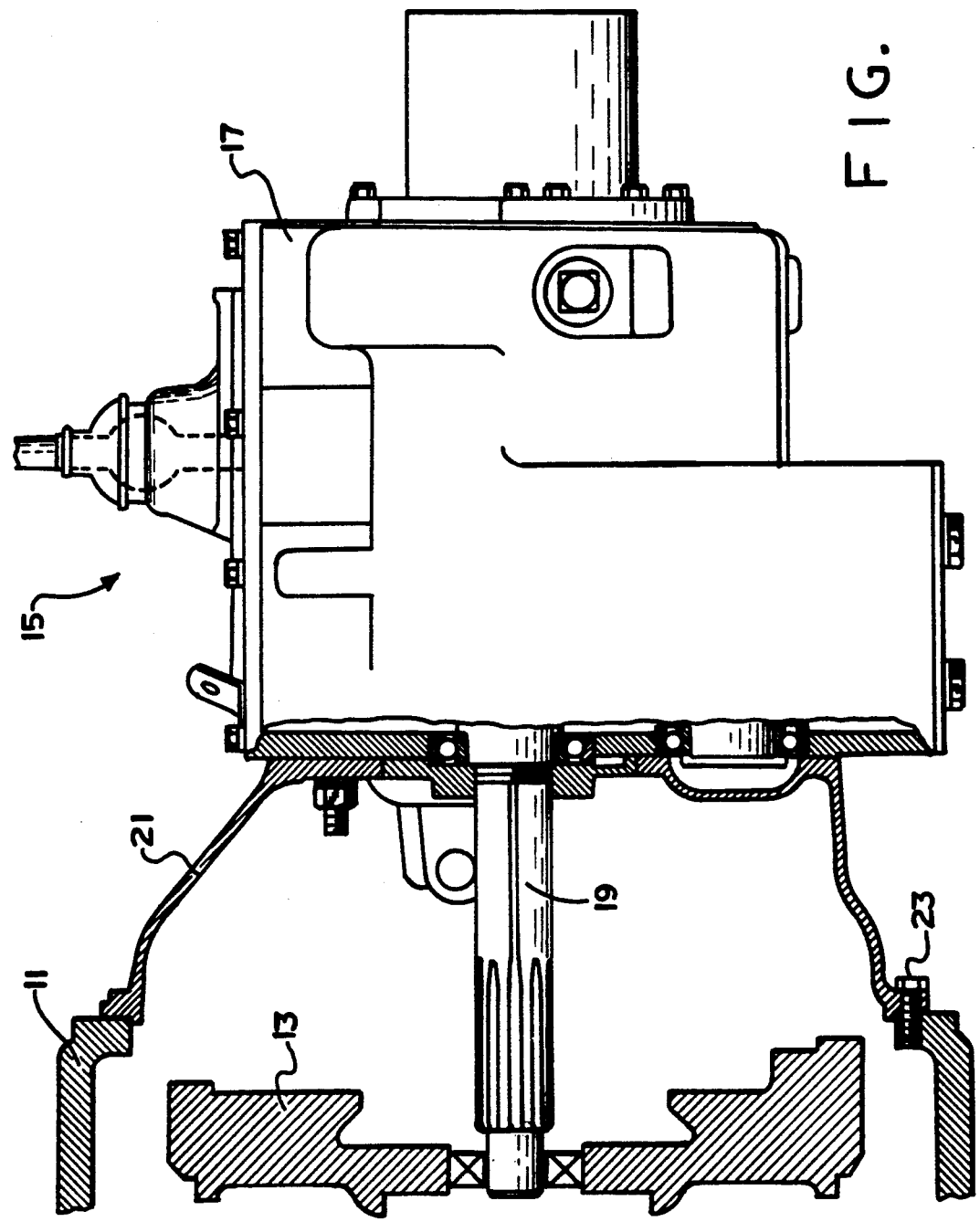
FIG. 1 a somewhat schematic view, partly in axial cross-section, and partly in plan view, illustrating a flywheel and transmission assembly of the general type with which the present invention may be utilized.

Referring now to the drawings, which are not intended to limit the invention, FIG. 1 is a somewhat schematic view of a flywheel and transmission assembly of the general type with which the present invention may be, or would be utilized. FIG. 1 is partly in axial cross-section, and partly in plan view. In the following description of the preferred embodiment, certain terms will be used for convenience, and are not intended to be limiting. Specifically, the terms "forward" and "rearward", or variations thereof, will be understood to have their normal meanings, whereby to the left in FIG. 1 is forward, and to the right in FIG. 1 is rearward. The flywheel and transmission assembly illustrated in FIG. 1 includes a flywheel housing 11, shown fragmentarily in FIG. 1, within which is disposed a flywheel member 13. It should be noted that for ease of illustration in FIG. 1, the normal manually actuatable clutch assembly, which would engage the flywheel member 13, has been deleted. Disposed rearwardly of the flywheel housing 11, and typically bolted thereto is a change-gear transmission assembly, generally designated 15, which may be of the general type illustrated and described in U.S. Pat. No. 4,989,706, assigned to the assignee of the present invention, and incorporated herein by reference. The assembly 15 includes a transmission 17, which receives input torque from the engine (not shown) and the flywheel member 13, through the clutch assembly (not shown) by means of an input shaft 19.

Bolted to the transmission 17, and surrounding the input shaft 19 is a transmission clutch housing 21. In FIG. 1, which is intended to illustrate primarily the environment of the present invention, both the flywheel housing 11 and the transmission clutch housing 21 define SAE No. 2 bolt patterns, and therefore, the clutch housing 21 may readily be bolted to the flywheel housing 11 by means of a plurality of capscrews 23.

As is mentioned in the background of the specification, it would be desirable to have, for any particular transmission 17, only a single transmission clutch housing, usable with either the flywheel housing 11 shown in FIG. 1, which has an SAE No. 2 bolt pattern, or with a different flywheel housing, having an SAE No. 1 bolt pattern. Although the invention is described herein in connection with SAE No. 1 and SAE No. 2 bolt patterns, it should be understood by those skilled in the art that the invention is not so limited, except to the extent specifically set forth in the claims.

Figure 4:
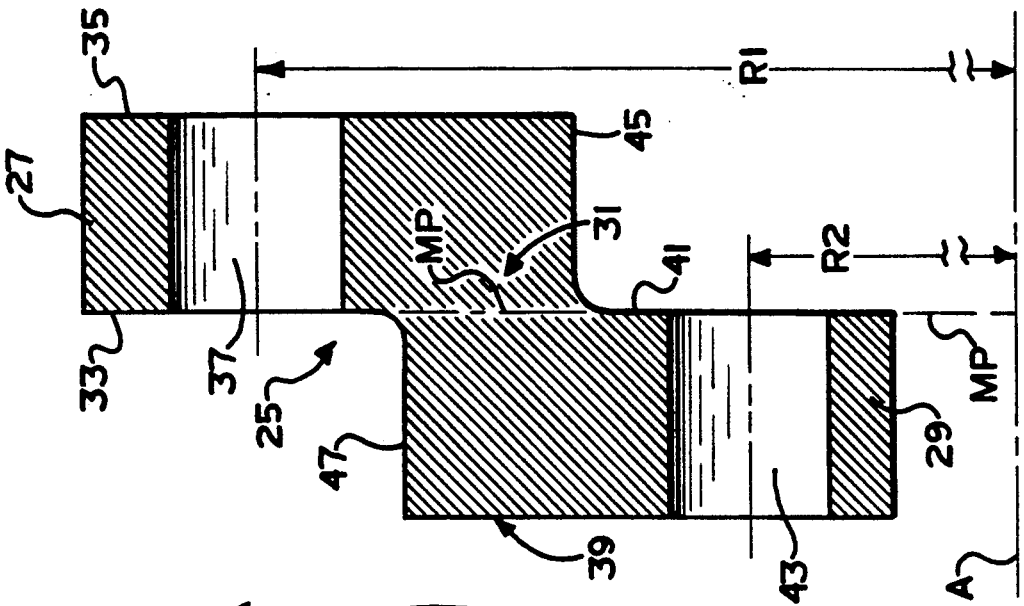
FIG. 4 is an enlarged, axial cross-section through the adaptor of FIGS. 2 and 3, taken on line 4—4 of FIG. 3.
Figure 3:
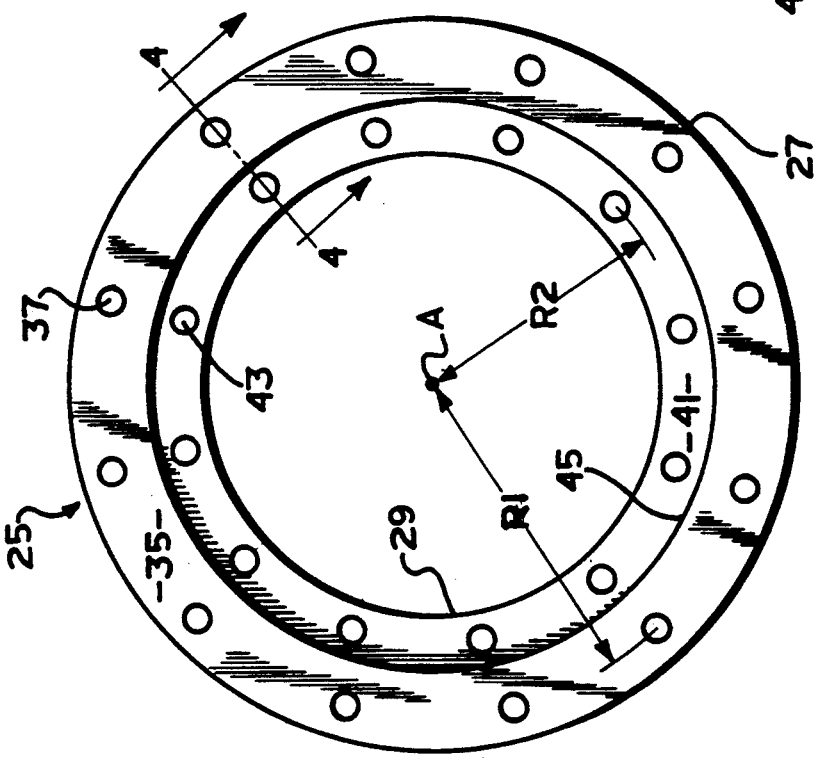
FIG. 3 is a rear elevation of the adaptor shown in FIG. 2, viewed from the right in FIG. 2.
Figure 2:
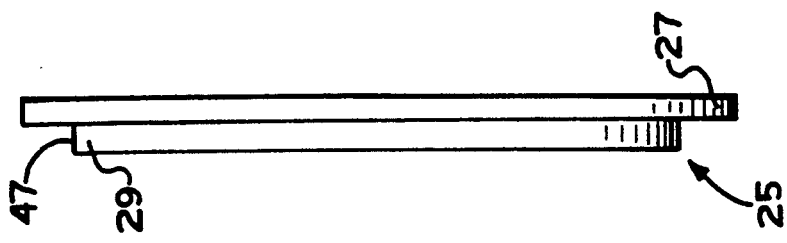
FIG. 2 is a side elevation view of an adaptor made in accordance with the present invention.

Referring now primarily to FIGS. 2 through 4, an adaptor, generally designated 25, will be described, the adaptor 25 comprising one important aspect of the present invention.

The adaptor 25 is a generally annular member including a radially outer first portion 27, and a radially inner second portion 29. In the subject embodiment, the outer and inner portions 27 and 29 comprise a single, integrally formed member, although the portions 27 and 29 may be viewed as being joined by an intermediate portion 31. The outer first portion 27 of the adaptor 25 includes a forward surface 33 and a rearward surface 35, and defines a plurality of bolt holes 37. Similarly, the inner second portion 29 defines a forward surface 39, and a rearward surface 41, and defines a plurality of bolt holes 43. It is one important aspect of the present invention that the forward surface 33 of the first potion 27 defines an imaginary, transverse mounting plane MP, and that the rearward surface 41 of the second portion 29 is also co-planar with, and coincides with, the mounting plane MP, for reasons to be described in greater detail subsequently.

Referring now primarily to FIGS. 3 and 4, it may be seen that there are twelve of the bolt holes 37, each of which is disposed at a radius R1 relative to an axis of rotation A, which typically would coincide with the axis of rotation of the input shaft 19. Similarly, there are 12 of the bolt holes 43, each of which is disposed at a radius R2 from the axis of rotation A. In the subject embodiment, the bolt holes 37 comprise an SAE No. 1 bolt circle pattern, while the bolt holes 43 comprise an SAE No. 2 bolt circle pattern, although the invention is not so limited as was mentioned previously.

Referring still to FIGS. 2 through 4, the outer first portion 27 of the adaptor 25 defines a generally cylindrical pilot surface 45, while the inner second portion 29 of the adaptor 25 defines a generally cylindrical outer surface 47, the function of which will be described subsequently.

Figure 5:
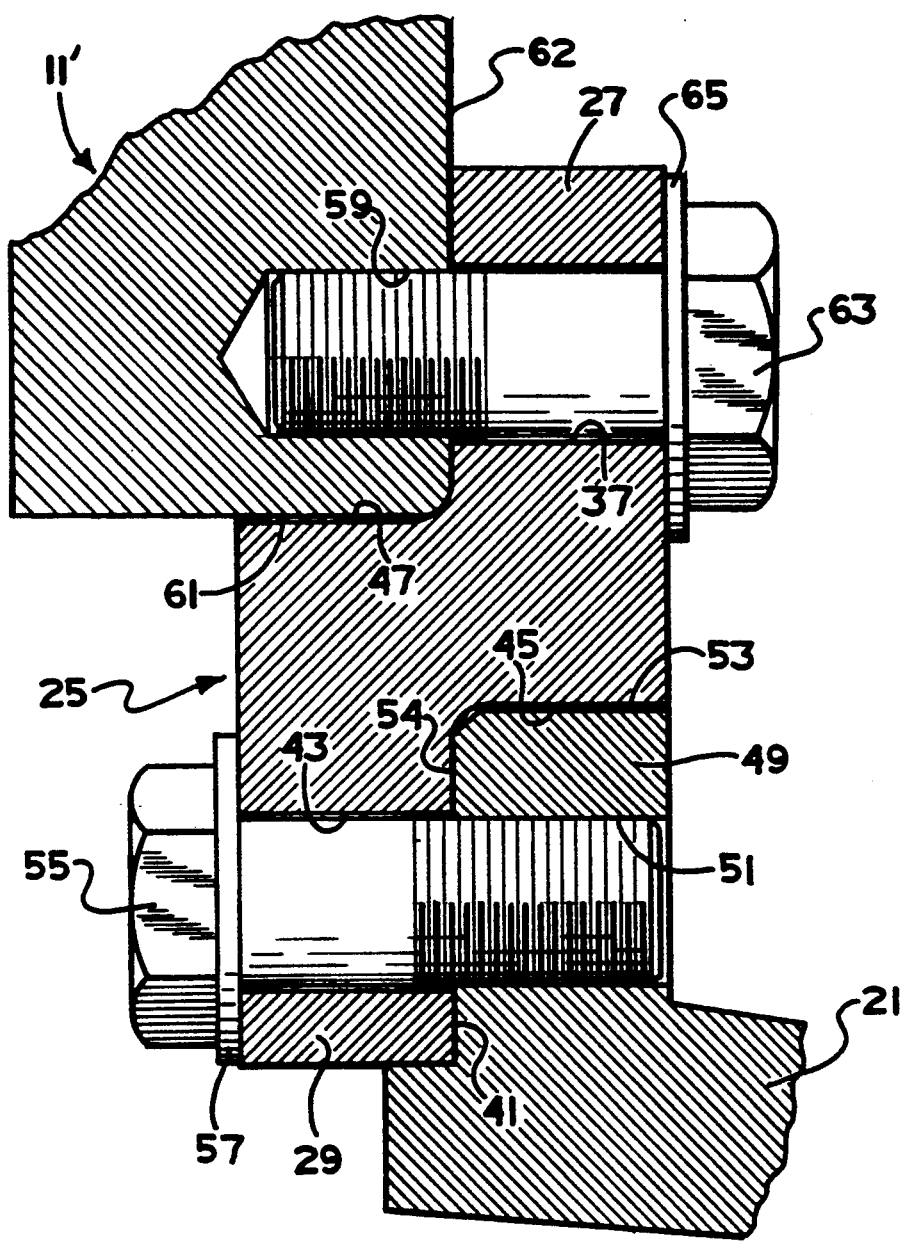
FIG. 5 is a view similar to FIG. 4, but illustrating the adaptor of the present invention in a flywheel and transmission assembly.

Referring now primarily to FIG. 5, the assembly of the adaptor 25 of the present invention, as part of a flywheel and transmission assembly, will be described. The transmission clutch housing 21 defines a radially-extending flange portion 49, the flange portion 49 in turn defining twelve tapped holes 51. The pattern of the holes 51 comprises an SAE No. 2 bolt circle pattern, corresponding to the pattern defined by the bolt holes 43. The flange portion 49 defines a cylindrical outer surface 53 which, during assembly, is received in a close-fit relationship within the pilot surface 45, thus providing proper alignment between the bolt holes 43 and the tapped holes 51. After proper alignment is achieved, a capscrew 55, equipped with a lock washer 57, is inserted through each hole 43 and threaded into the respective tapped hole 51, until a forward surface 54 of the flange portion 49 is in tight engagement with the rearward surface 41 of the second portion 29.

In connection with FIG. 1, the transmission clutch housing 21 (which is an SAE No. 2) was described in the environment of being attached directly to a flywheel housing 11 which is also an SAE No. 2. In FIG. 5, the transmission assembly 15 is instead to be used with a flywheel housing 11' defining twelve tapped holes 59 which define an SAE No. 1 bolt circle pattern. The flywheel housing 11' also defines a generally cylindrical pilot surface 61 which, during assembly, receives therein in a close-fit relationship, the outer surface 47 defined by the adaptor 25. This pilot arrangement ensures proper alignment of the bolt holes 37 and the tapped holes 59. Once the proper alignment has been achieved, a capscrew 63 equipped with a lock washer 65 is inserted through each of the bolt holes 37 and threaded into the respective tapped hole 59, until the forward surface 33 of the first portion 27 is in engagement with a mounting surface 62 defined by the flywheel housing 11'.

Referring now to FIGS. 4 and 5, it may be seen that one important aspect of the present invention is attaching the transmission clutch housing 21 to the flywheel housing 11' such that the forward surface 54 defined by the flange portion 49 and the mounting surface 62 defined by the flywheel housing 11' both coincide with the mounting plane MP. Thus, the axial position of the transmission clutch housing 21, relative to the flywheel housing 11' is exactly the same as it would have been relative to the flywheel housing 11, such that no changes are required with regard to the input shaft 19, or the length, configuration, or mounting thereof.

It may be seen from FIG. 5 that in order for the present invention to be practical, there must be a "substantial" difference between the radius R1 of the bolt holes 37 and the radius R2 of the bolt holes 43. By way of example only, the diameter of an SAE No. 1 bolt circle is 20⅜ inches, while the diameter of an SAE No. 2 bolt circle is 18⅛ inches, a diametrical difference of 2¼ inches.

Although the adaptor 25 was described herein as being formed as a single, integral member, those skilled in the art will recognize that a number of other methods of fabrication could be used. For example, the first and second portions 27 and 29 could each define a separate annular member, with the members being joined, face-to-face, along the mounting plane MP, in which case the intermediate portion 31 could be viewed as comprising that portion of each of the members 27 and 29 immediately adjacent the plane MP. It is believed that various other configurations and methods of fabrication may occur to those skilled in the art, but it should be understood that the spatial relationships described previously comprise the essential features of the invention, rather than the method of fabrication.

It should be understood by those skilled in the art that the use of generic terms such as "bolt holes" and "bolt circle pattern" herein do not specifically require the use of bolts, and in the embodiment shown, capscrews 55 and 63 have been used as the connectors, although nuts and bolts could be used where the configuration permits, and if economically feasible.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. An adaptor for use with a transmission clutch housing whereby said housing may be attached, selectively, to one flywheel housing which defines a first bolt circle pattern, or to another flywheel housing which defines a second bolt circle pattern, said first bolt circle pattern having a substantially larger diameter than said second bolt circle pattern; said transmission clutch housing defining said second bolt circle pattern; said adaptor including a first portion defining forward and rearward axially spaced apart surfaces, said forward surface defining an imaginary transverse mounting plane and adapted to be disposed in engagement with a mounting surface defined by said one flywheel housing, said first portion defining a plurality of bolt holes defining said first bolt circle pattern, and adapted to be connected to said one flywheel housing; said adaptor further comprising a second portion defining forward and rearward axially spaced apart surfaces, and means interconnecting said first and second portions; said adaptor being configured such that said second portion thereof is adapted to be disposed within said one flywheel housing, and said rearward surface of said second portion of said adaptor coincides with said imaginary transverse mounting plane; said second portion defining a plurality of bolt holes defining said second bolt circle pattern, and adapted to be connected to said transmission clutch housing, whereby the relative axial position of said transmission clutch housing and said one flywheel housing is adapted to be substantially identical to the relative axial position of said transmission clutch housing and said another flywheel housing.

2. An adaptor as claimed in claim 1, characterized by said first portion being generally annular, and said second portion being generally annular.

3. An adaptor as claimed in claim 2, characterized by said annular first and second portions and said means interconnecting said portions comprising a single, integral member.

4. An adaptor as claimed in claim 1, characterized by said first portion defining a radially inwardly-disposed first pilot surface, adapted to pilot an external surface defined by said transmission clutch housing, and said second portion defining a radially outwardly-disposed second surface, adapted to be piloted by an internal pilot surface defined by said one flywheel housing.

5. An adaptor as claimed in claim 1, characterized by said first bolt circle pattern comprising an SAE No. 1 pattern, and said second bolt circle pattern comprising an SAE No. 2 pattern.

6. A flywheel and transmission assembly comprising a flywheel housing defining a rearwardly-disposed mounting surface, and a plurality of bolt holes defining a first bolt circle pattern; a transmission clutch housing defining a forwardly-disposed mounting surface, and a plurality of bolt holes defining a second bolt circle pattern, said first bolt circle pattern having a substantially larger diameter than said second bolt circle pattern; and an adaptor comprising a first portion defining a forward surface disposed in engagement with said rearwardly-disposed mounting surface, said forward surface defining an imaginary transverse mounting plane, said first portion defining a plurality of bolt holes defining said first bolt circle pattern; said adaptor further comprising a second portion defining a rearward surface disposed in engagement with said forwardly-disposed mounting surface, and means interconnecting said first and second portions; said second portion of said adaptor being disposed within said flywheel housing, and said rearward surface of said second portion coinciding with said imaginary transverse mounting plane; said second portion defining a plurality of bolt holes defining said second bolt circle pattern; a first plurality of connectors attaching said first portion of said adaptor to said flywheel housing, and a second plurality of connectors attaching said second portion of said adaptor to said transmission clutch housing.

7. A flywheel and transmission assembly as claimed in claim 6, characterized by said first portion of said adaptor being generally annular, and said second portion of said adaptor being generally annular.

8. A flywheel and transmission assembly as claimed in claim 7, characterized by said annular first and second portions and said means interconnecting said portions comprising a single, integral member.

9. A flywheel and transmission assembly as claimed in claim 6, characterized by said first portion of said adaptor defining a radially inwardly-disposed pilot surface closely spaced apart from an external surface defined by said transmission clutch housing and said second portion defining a radially outwardly-disposed second surface, closely spaced apart from an internal pilot surface defined by said flywheel housing.

10. A flywheel and transmission assembly as claimed in claim 6, characterized by said first bolt circle pattern comprises an SAE No. 1 pattern, and said second bolt circle pattern comprises an SAE No. 2 pattern.

* * * * *